United States Patent
Elaasar

(10) Patent No.: US 8,966,437 B2
(45) Date of Patent: Feb. 24, 2015

(54) METHOD AND APPARATUS OF SPECIFYING THE CONCRETE SYNTAX OF GRAPHICAL MODELING LANGUAGES

(75) Inventor: Maged E. Elaasar, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 1302 days.

(21) Appl. No.: 12/628,590

(22) Filed: Dec. 1, 2009

(65) Prior Publication Data

US 2011/0131546 A1 Jun. 2, 2011

(51) Int. Cl.
*G06F 9/44* (2006.01)

(52) U.S. Cl.
CPC .................................... *G06F 8/10* (2013.01)
USPC ............ 717/105; 717/104; 717/143; 717/144

(58) Field of Classification Search
None
See application file for complete search history.

(56) References Cited

U.S. PATENT DOCUMENTS

| | | | |
|---|---|---|---|
| 6,988,062 B2 | 1/2006 | Srinivasa | |
| 7,082,386 B2 | 7/2006 | Srinivasa | |
| 7,389,304 B2* | 6/2008 | Boyer et al. ....................... | 1/1 |
| 7,441,230 B2 | 10/2008 | Kainz et al. | |
| 7,463,263 B2 | 12/2008 | Gilboa | |
| 7,526,499 B2* | 4/2009 | Conn et al. ...................... | 1/1 |
| 7,664,729 B2 | 2/2010 | Klein et al. | |
| 7,668,608 B2 | 2/2010 | Nixon et al. | |
| 7,681,176 B2* | 3/2010 | Wills et al. ..................... | 717/109 |
| 7,945,892 B1 | 5/2011 | Kainz et al. | |
| 7,987,444 B2 | 7/2011 | Fuller, III et al. | |
| 7,987,445 B2 | 7/2011 | Fuller, III et al. | |
| 8,156,147 B1* | 4/2012 | Tocci et al. ................... | 707/790 |
| 8,365,141 B1 | 1/2013 | Yan | |
| 8,423,879 B2 | 4/2013 | Bhatt et al. | |
| 8,572,504 B1* | 10/2013 | Forstot et al. ................. | 715/764 |
| 8,578,346 B2 | 11/2013 | Chao et al. | |
| 8,601,432 B2 | 12/2013 | Bornhoevd et al. | |
| 2005/0097453 A1* | 5/2005 | Simonyi ........................ | 715/513 |
| 2006/0136482 A1* | 6/2006 | Conn et al. .................... | 707/102 |
| 2007/0011189 A1* | 1/2007 | Elaasar et al. ................ | 707/102 |
| 2007/0013697 A1* | 1/2007 | Gilboa .......................... | 345/440 |
| 2007/0180424 A1 | 8/2007 | Kazakov et al. | |
| 2008/0092109 A1* | 4/2008 | Kinnucan et al. ............. | 717/105 |

(Continued)

FOREIGN PATENT DOCUMENTS

JP 361246839 A 11/1986

OTHER PUBLICATIONS

'Diagram Interchange for UML' by Marko Boger et al., UML '02 Proceedings of the 5th International Conference on the Unified Modeling Language, 2002.*

(Continued)

*Primary Examiner* — Steven Snyder
(74) *Attorney, Agent, or Firm* — Holland & Knight LLP; Brian J. Colandreo, Esq.; Jeffrey T. Placker, Esq.

(57) ABSTRACT

A computer based method, system and apparatus specify graphical concrete syntax in a modeling language. The invention system declaratively describes the graphical concrete syntax of a diagram of a subject model. A mapping engine maps between (i) the graphical concrete syntax and (ii) the abstract syntax and corresponding diagram interchange syntax of the subject model. The declarative descriptions define structure of the graphical concrete syntax rather than a rendering (painting) logic of the graphical concrete syntax.

20 Claims, 12 Drawing Sheets

THE MVC ARCHITECTURE MAPPING TO METAMODELING DOMAIN

(56) References Cited

U.S. PATENT DOCUMENTS

| | | | | |
|---|---|---|---|---|
| 2008/0092111 | A1* | 4/2008 | Kinnucan et al. | 717/105 |
| 2010/0146377 | A1* | 6/2010 | Simonyi | 715/229 |
| 2010/0325605 | A1 | 12/2010 | Ding et al. | |
| 2011/0088011 | A1* | 4/2011 | Ouali | 717/105 |
| 2012/0226967 | A1* | 9/2012 | Oh | 715/205 |
| 2012/0331443 | A1* | 12/2012 | Amid et al. | 717/104 |
| 2013/0019224 | A1* | 1/2013 | Madl et al. | 717/104 |

OTHER PUBLICATIONS

'Unified Modeling Language: Diagram Interchange' version 2.0, ptc/05-06-04, Jun. 2005.*
'UML Profile for Schedulability, Performance, and Time Specification' version 1.0, Sep. 2003.*
'A Comprehensive Survey of UML Compliance in Current Modelling Tools' by Holger Eichelberger et al., from Software Engineering Conference in Kaiserslautern, Mar. 2009.*
'Correctly Defined Concrete Syntax for Visual Modeling Languages' by Thomas Baar, copyright Springer-Verlag Berlin Heidelberg, 2006.*
'Making Metamodels Aware of Concrete Syntax' by Frederic Fondement and Thomas Baar, copyright Springer-Verlag Berlin Heidelberg, 2005.*
'On the Usage of Concrete Syntax in Model Transformation Rules' by Thomas Baar and Jon Whittle, copyright Springer-Verlag Berlin Heidelberg, 2007.*
'Specifications, not Meta-Models' by James Skene and Wolfgang Emmerich, copyright 2006, ACM.*
'Diagram Interchange' Specification version 1.0, OMG, Apr. 2006.*
'Creating and reconciling diagrams after executing model transformations' by Marcus Alanen et al., copyright 2007, Elsevier B.V.*
'What's New in UML 2.0?' by Bran Selic, IBM, Apr. 2005.*
'Automatic Generation of Modelling Tools' by Jan P. Nytun et al., copyright Springer-Verlag Berlin Heidelberg, 2006.*
'Real-Time Object Uniform Design Methodology with UML' by Bui Minh Duc, copyright 2007, pp. 86-88.*
'Making Metamodels Aware of Concrete Syntax (2005)' by Frederic Fondement and Thomas Baar, ecmda-fa '05, vol. 3748 of lncs.*
'Classification of Model Transformation Approaches' by Krzysztof Czarnecki and Simon Helsen, OOPSLA'03 Workshop on Generative Techniques in the Context of Model-Driven Architecture.*
'A Mapping Language from Models to DI Diagrams' by Marcus Alanen et al., MoDELS 2006, LNCS 4199, pp. 454-468, 2006.*
IBM Software Group Presentation entitled "Diagram Definition Proposal Status" presented at OMB Advances Standards at Technical Meeting in Santa Clara, California, Dec. 8-12, 2008, 25 page PowerPoint, 2 pages meeting announcement retrieved from Internet, Oct. 28, 2009.
UML Tool—Wikipedia, The Free Encyclopedia, downloaded on Dec. 4, 2013, pp. 1-4.
Boger et al., "Diagram Interchange for UML," UML 2002 Proceedings of the 5th International Conference on The Unified Modeling Language, 2002, 1-15.
Boger et al, Diagram Interchange for UML, UML '02 Proceedings of the 5th International Conference on the Unified Modeling Language, http://dl.acm.org./citation.cfm?id=719616, Abstract downloaded on Oct. 15, 2012, pp. 1-3.

* cited by examiner

DG GRAPHICS TYPE

A UML CLASS SHAPE

A LESS EFFICIENT SPECIFICATION OF UML CLASS FIGURE

A MORE EFFICIENT SPECIFICATION OF A UML CLASS FIGURE

DG MAPPING TYPES

A MAPPING DECOMPOSITION FOR A UML CLASS SHAPE

METHOD AND APPARATUS OF SPECIFYING THE CONCRETE SYNTAX OF GRAPHICAL MODELING LANGUAGES

BACKGROUND

As modeling of software programs (and program design) is becoming more and more mainstream in the software development industry and with the expected wide-spread use of domain-specific modeling languages, the ability to quickly create modeling tools for those languages is becoming more critical than ever. A modeling language is defined both in terms of its abstract syntax and its concrete syntax (surface notation). For graphical modeling languages, there is also the diagram interchange syntax.

The abstract syntax is typically defined with the Meta Object Facility (MOF) specification, a standard from the Object Management Group (OMG). Fortunately, over the past decade there has been reported success in implementing MOF and mapping it to technology domains such as Java as in the Eclipse Modeling Framework (EMF). This has bootstrapped a lot of modeling language implementations like the infamous Eclipse UML2 project, which is used in some popular modeling tools like Rational Software's UML modeling tools (RSA, RSM, RSD . . . etc).

As for the diagram interchange syntax, OMG provides a Diagram Interchange (DI) standard. Unfortunately, this standard did not get widely adopted in the industry to date. Instead various tool vendors defined proprietary DI specifications, like the one provided by the Graphical Editing Framework (GMF), and provided tooling for it. In an effort to remedy the situation, OMG has issued a new request for proposal (RFP) for Diagram Definition, requesting solutions that address the weaknesses of DI, mainly the ability to define valid compositions of DI blocks for a given diagram type. A separate patent application by Assignee covers a proposal for a solution to this same problem.

Although the abstract syntax and diagram interchange syntax are two important parts of a modeling language specification, the concrete syntax is the part that is least formalized despite the fact it accounts for most of the cost of developing a modeling tool. The concrete syntax of a graphical modeling language specifies the graphical building blocks that constitute the surface notation and their mapping to the abstract syntax and DI syntax of the language. Most current specifications of graphical modeling languages resort to a combination of informal text and pictures to depict the concrete syntax, causing inconsistencies and confusion to users and vendors alike.

What is needed is a formal way to specify the graphical concrete syntax of a graphical modeling language.

SUMMARY

The present invention proposes an approach to formally specify the graphical concrete syntax and its mapping to the abstract syntax and DI syntax of graphical modeling languages. More particularly the present invention proposes a new modeling language or system called Diagram Graphics (DG). The DG system is formed of two parts. The first part allows for modeling the graphical building blocks that make up the surface notation (concrete syntax), the graphical building blocks being graph elements or graphing units generally speaking. The second part allows for modeling a structured mapping between those graphical building blocks and their abstract and DI syntax counterparts. Using the invention DG system along with MOF and DI, a graphical modeling language would be completely and unambiguously specified.

In a preferred embodiment, a computer-based method and system of specifying concrete syntax of a graphical modeling language, comprises: a declarative description generator and a mapping engine. A main architecture has a model defined by an abstract syntax and a corresponding diagram interchange syntax. The invention declarative description generator defines a graphical representation of the model by providing a declarative description of a graphical concrete syntax of a diagram of the model. The invention mapping engine models a structured mapping between (i) the graphical concrete syntax and (ii) the abstract syntax and the corresponding diagram interchange syntax of the model. The provided declarative description and mapping engine modeling enables specification of the graphical modeling language to be complete. The graphical modeling language may be, for example, UML (Unified Modeling Language).

In accordance with one aspect of the present invention, the declarative description generator providing the declarative description includes modeling graphical building blocks (graph elements or graphing units) that form the graphical concrete syntax. The structured mapping is then between (i) the graphical building blocks and (ii) the abstract syntax and the corresponding diagram interchange syntax of the model.

The mapping engine modeling may include utilizing a declarative description of the structured mapping. The declarative descriptions of the invention system may employ a diagram graphics language having a figure type.

The diagram graphics language may further include:
a layout type enabling representation of layout algorithms; and
a layout data type enabling representation of attributes.

In one embodiment, the values of the attributes may be set by default.

In one embodiment, the figures of the figure type may be nested.

In embodiments, the declarative descriptions effectively define structure of the graphical concrete syntax rather than a rendering logic of the graphical concrete syntax.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this patent specification, specify the presence of stated features, integers, steps, operations, elements, and/or components, but do not preclude the presence or addition of one or more other features, integers, steps, operations, elements, components, and/or groups thereof.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

The teachings of all patents, published applications and references cited herein are incorporated by reference in their entirety.

Diagram Graphics (DG)
Overview

The OMG's RFP (request for proposals) for Diagram Definition calls for solutions to two related problems. The first problem is the interchange of modeling diagram (the subject of another patent disclosure), where the diagram syntax is defined and interchanged. The second problem is the specification of the diagram's graphical concrete syntax and its mapping to the abstract syntax and DI syntax (how the interchanged model is rendered graphically). This patent disclosure of the present invention gives a proposal to address this second problem assuming an acceptable solution is available for the first problem.

Usually graphical language specifications use informal methods, like a combination of text and pictures, to depict their graphical concrete syntax and describe how it relates to the abstract syntax defined in MOF. This informality often leads to inconsistencies and misinterpretations of the specifications, which often results in extra effort and cost for tool vendors implementing the specification as well as users trying to comprehend them.

Figure 1:
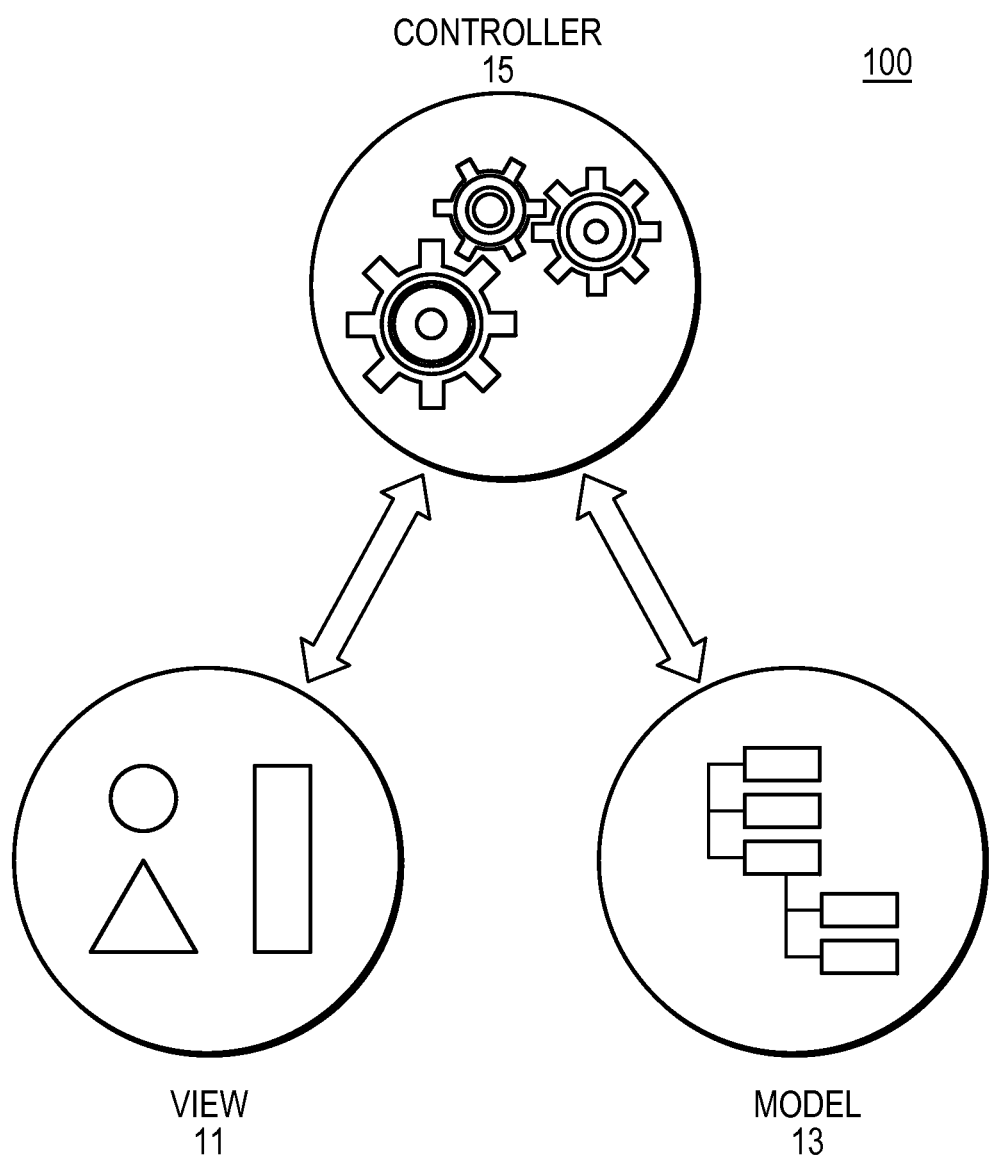
FIGS. 1 and 2 are schematic over views of a main architecture of the present invention.

The present invention addresses the problem of formally describing the graphical concrete syntax and its mapping from the abstract syntax of graphical MOF-based languages. The main architecture 100 that is adopted by the present invention to solve this problem is the Model-View-Controller (MVC) architecture, shown in FIG. 1. The basic idea is to separate between how a model is defined (the model 13) and how it is graphically represented (the view 11). The rule of thumb is that a model 13 and a view 11 should never know about each. The details of how to map between them is defined by a third entity (the controller 15).

In the context of this description, the model 13 is defined with both the abstract syntax and its corresponding diagram syntax. The reason the model 13 is not only represented by the abstract syntax is that the diagram syntax captures information needed to render the concrete syntax properly. For example, the name string of a UML class shape is defined in the abstract syntax, however the position and the size of the shape is defined in the diagram syntax.

Figure 2:
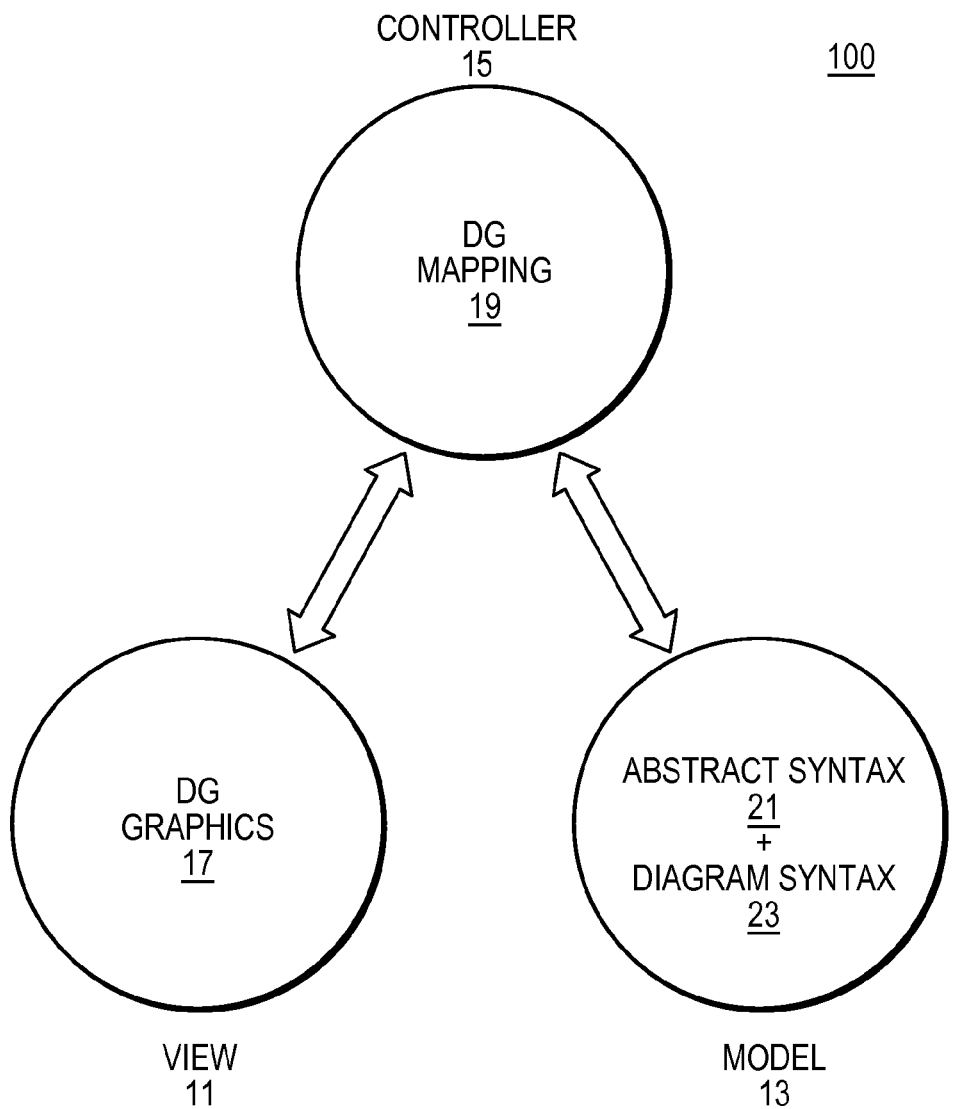

On the other hand, the view 11 and the controller 15 in the context of this modeling language specification is yet to be defined. The present invention presents an approach to define the view 11 and the controller 15 parts of the architecture 100 declaratively using a language or system called Diagram Graphics (DG). Referring to FIG. 2, the language/system has two parts: one part 17 allows for the declarative description of the graphical syntax (graphical concrete syntax) and another part 19 allows for the declarative description of mappings from the model 13 (the abstract syntax 21 and the corresponding diagram syntax 25) to this graphical syntax. Both descriptions (at 17 and 19) are done in a graphical technology neutral fashion. The idea is to keep those descriptions independent but mappable to concrete syntax graphical technologies. FIG. 2 shows the MVC architecture 100 mapped to the current problem.

Metamodel Description
Type Hierarchy

The invention DG language or system 110 (FIG. 3) has a metamodel that allows for the declarative description of graphics 17 and its mapping 19 from models 13. Rather than trying to include all kinds of specific building blocks of graphics 17 and mapping 19, which leaves the metamodel bloated and ever changing (to accommodate requests for additional building blocks by specific domains), the metamodel focuses on defining the main building blocks (graph elements or graphing units) that can be further specialized by instances of the metamodel. This strategy gives the different domains the flexibility to define their own building blocks that come from their own idioms and terminology. For example, the concept of a "swim lanes" is familiar to UML modelers, while not necessarily to data modelers. Using this approach, each domain can instantiate the main building blocks (graph elements or graphing units) of DG system 110 to create its own library of building blocks. Some building blocks are shared across domains and those can be defined in standard reusable DG libraries.

Figure 3:
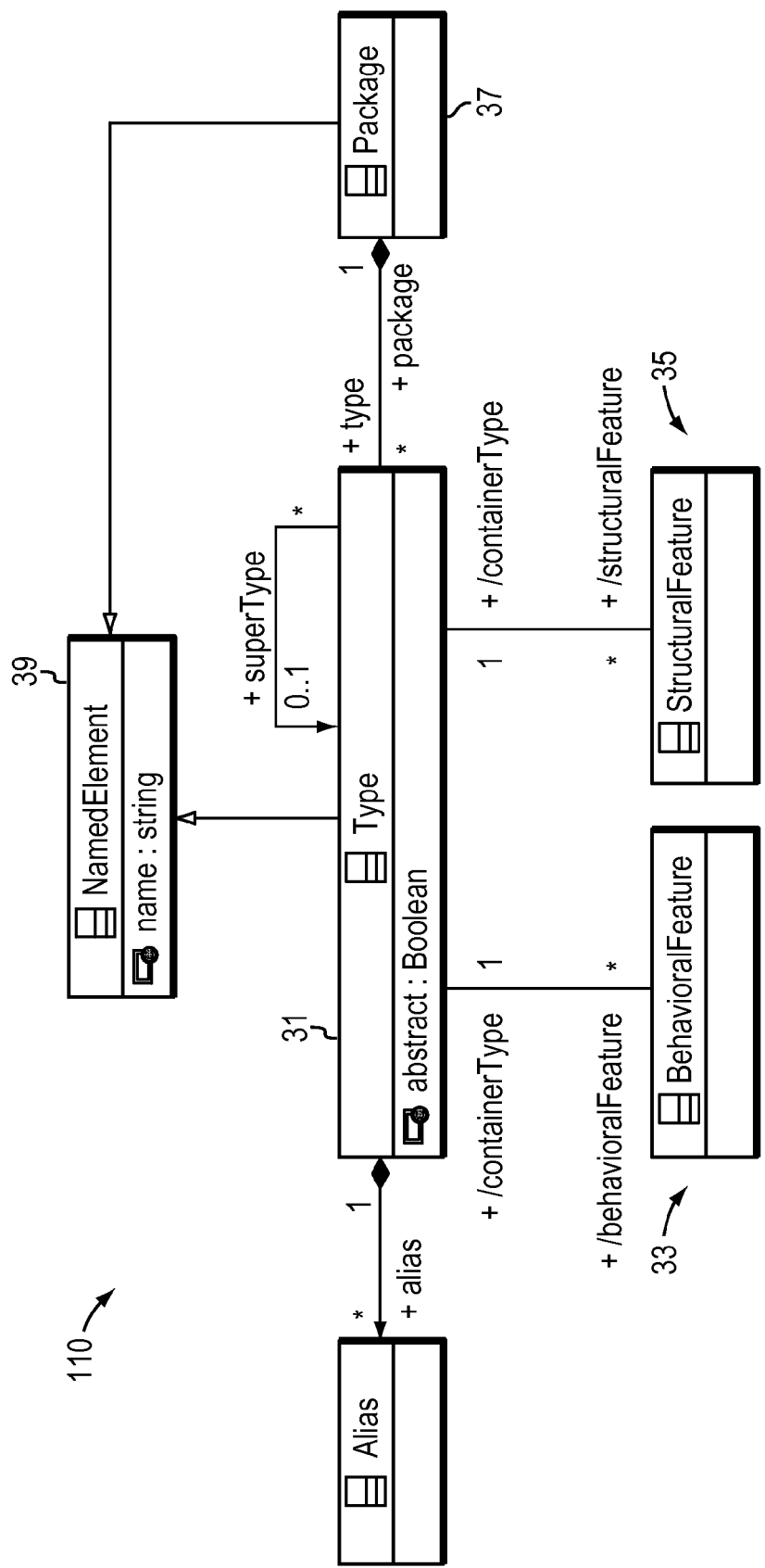
FIG. 3 is a diagram of Type Abstractions and semantics in the meta model of the present invention Diagram Graphics (DG) system.

The way the invention DG system 110 defines those main building blocks is inspired by the MOF class diagram semantics. DG system 110 defines general type semantics that is extended by the graphics 17 and the mapping 19 components of the metamodel. FIG. 3 shows the main abstractions that define DG's 110 Type semantics. The core abstraction is that of a DG Type 31, which represents an encapsulation of structure 35 and behavior 33. Types 31 can be declared as abstract or concrete and participate in single inheritance hierarchies with refinement semantics allowing Types 31 to be incrementally extended and refined. Types 31 are contained by packages 37 that represent their namespace 39. Types 31 define their structure using a collection of structural features 35 and define their behavior using a collection of behavioral features 33. The Type abstraction is further extended to define more specialized types for the graphics and mapping sub domains.

Figure 4:
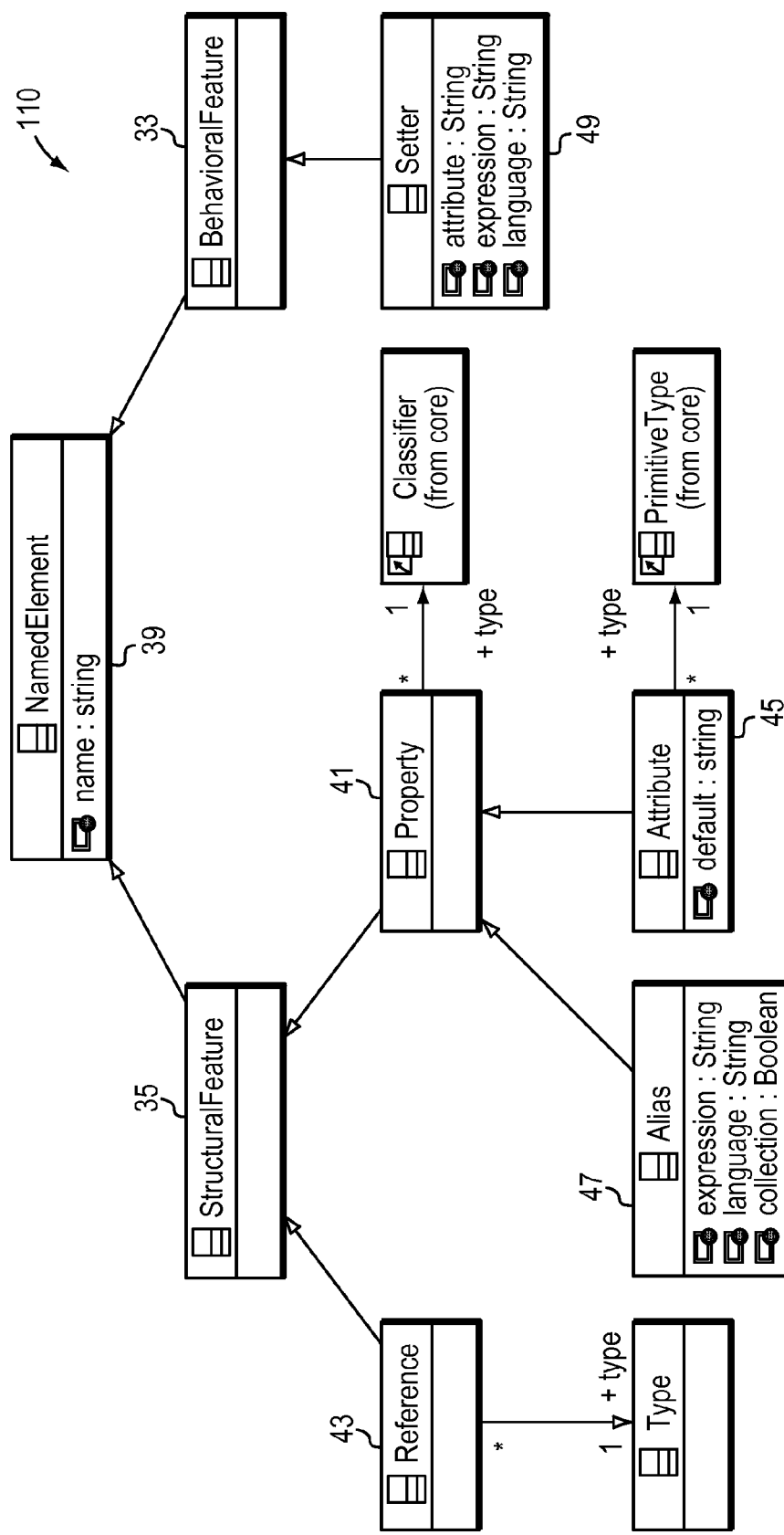
FIG. 4 is a diagram of structural features and behavioral features in the meta model of the present invention DG system of FIG. 3.

A Type's 31 structure is defined with structural features 35. A structural feature 35 represents data that is contained in a Type. DG 110 defines two kinds of structural features 35, a property 41 and a reference 43, as shown in FIG. 4. A property 41 represents simple data, while a reference 43 represents nested instances of other types in a container type. A property 41 is further specialized into other kinds. One kind is an attribute 45 representing a primitive data holder. Another kind is an alias 47 representing a read-only derived property. Other more specialized structural features 35 are introduced near their context later on.

On the other hand, a Type's 31 behavior is defined with behavioral features 33. A behavioral feature 33 defines a prescribed way to manipulate the structure of a Type 31. One type of behavioral feature 33 is a setter 49, which assigns values to attributes accessible in the Type's 31 structure. Other specialized behavioral features 33 are introduced near their context later on.

The Type semantics (FIGS. 3 and 4) allow those Types 31 to inherit and refine both structural and behavioral features 33, 35 in super Types by defining ones with similar names. The semantics of refinement varies depending on the kind of feature 33, 35.

Graphics Types

Figure 5:
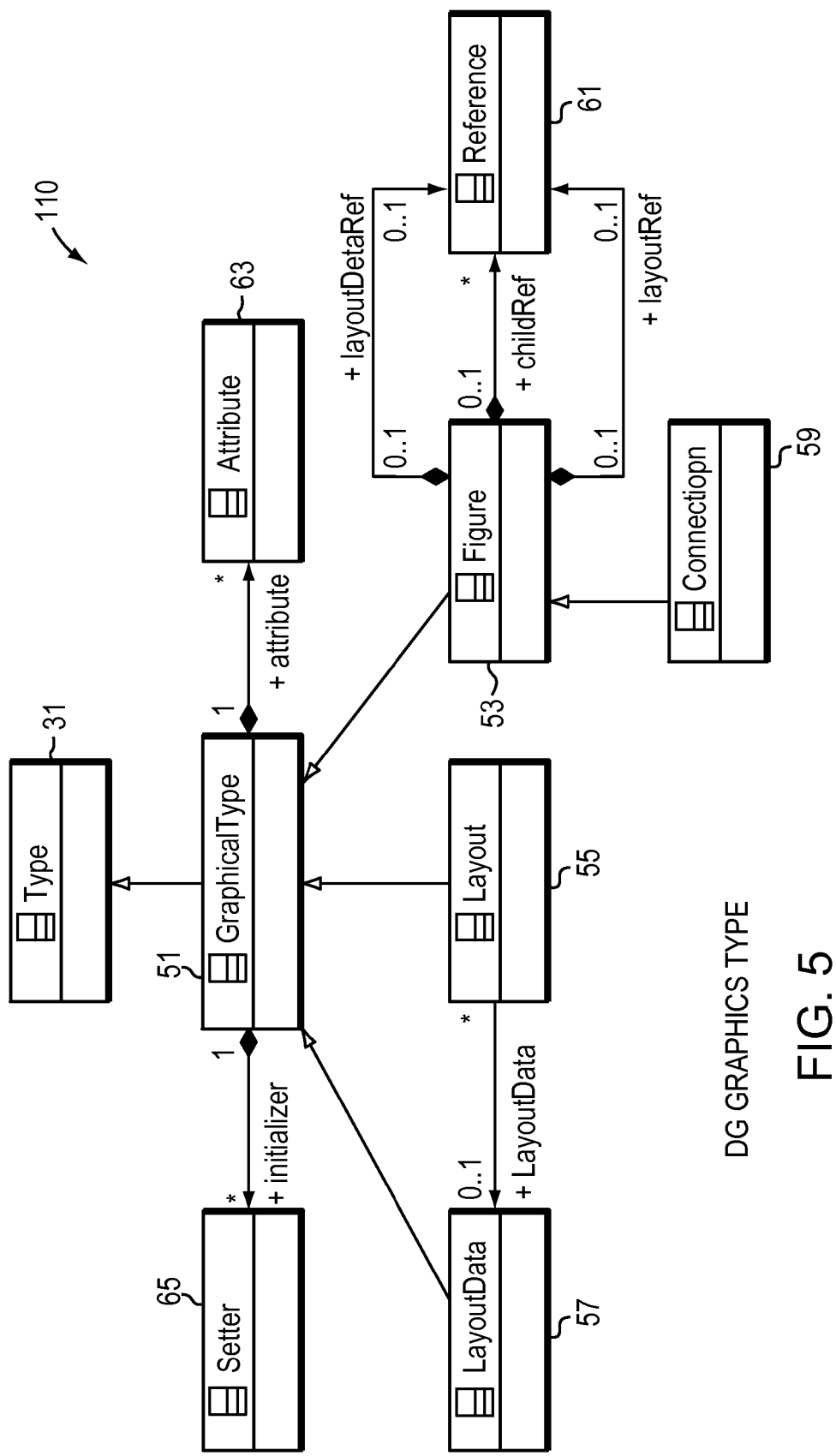
FIG. 5 is a diagram of Graphic Types in the present invention DG system of FIGS. 3 and 4.

The concept of a Type 31 is further specialized for the graphics sub domain to define a graphics type, as shown in FIG. 5. A Graphical Type 51 is the super type of all graphics types in DG 110. Three specific Graphical Types 51 are defined: a figure 53, a layout 55 (a layout algorithm) and a layout data 57 (a layout constraint). The clear understanding of the relationship between these three types 53, 55, 57 is critical to understanding the way graphics can be declaratively defined.

Before going into the details, it is important to state the goals that DG system 110 graphics is designed to achieve to set the expectations right. The main objective of DG graphics is to define the structure of the graphical syntax, i.e. the graphical building blocks and their attributes and relationships, rather than the rendering (painting) logic of that syntax. For example, a graphical building block that draws a rectangle is described by its attributes like position, size, colors, line style . . . etc. rather than the sequence of strokes that actually result in painting a rectangle. The rationale here is that while the painting logic still needs to be captured formally in code for tools to use, there is less pressing need to standardize it as it is usually not the source of confusion or misinterpretation in specification of graphical modeling languages. For example, there will be less confusion about how to draw a rectangle or how to render a text label with its italic style than on the fact that a class shape is represented as a rectangle (a certain geometrical shape) with a text label centered in its width containing the name of the class, which is italic when the class is abstract. These latter details (graphical syntax or graphical concrete syntax details) are what often lead to confusion and need to be formally defined.

Having clarified the goals of DG's declarative graphics, the details of how to design these declarations can be discussed. The easiest way to think about defining a graphical representation is to decompose it into its building blocks (graph elements or graphing units). Three graphical types, representing three kinds of building blocks, are defined in the invention DG 110. The first one is a "figure" 53 (FIG. 5) and it represents a unit of decomposition and rendering. A "figure" 53 has an ability to render itself within its bounds, a rectangular area in which a figure paints its contents and outside which painting is clipped. For example, a rectangle figure could be defined to paint a polygon tracing its bounds from inside.

A special kind of figure 53 is a connection 59, which renders as a polyline (a multi-segment line) whose start is anchored at a source figure and whose end is anchored at a target figure. The segments of the connection 59 get defined with "bend points", which are points specified relative to the anchors of a connector, through which the connection 59 has to route. Similar to a figure 53, a connection 59 can compose and layout children connections (e.g. labels and decorations/adornments).

The invention figure 53 can be nested to create more complex figures. In this case, a parent figure composes other figure 53 in its structure and becomes responsible for arranging them, i.e. setting their bounds, relative to its own bounds. Instead of doing this by itself, a figure 53 delegates this task to another reusable building block (graphing element/unit) defined by DG 110 called a layout 55, which represents a layout algorithm. A figure 53 can specify a reference 61 to a particular layout to arrange its child figures. Every layout 55 can be described in terms of its structure. DG 110 allows specifying the structure of the layout 55, rather the algorithm itself, which can be described in text and implemented by tools. Some layout algorithms require child figure 53 to define certain layout data (aka layout constraint) that affects its function. Layout data 57 is another reusable graphical type 51 in DG 110 whose structure gets specified. A child figure 53 can specify a reference 61 to a particular layout data 57 that suits the layout 55 installed on its parent figure.

In addition to the mentioned compositions allowed between graphical types 51, the structure of those types is specified with attributes 63. For example, a rectangle figure 53 can define a line style, a foreground color and a background color attributes 63. An XY layout 55 algorithm, on the other hand, does not have its own significant structure but requires that XYLayoutData is specified on child figure. That layout data's 57 structure consists of a location (x and y) and a size (width and height) attributes 63. The values of these attributes can be specified in two ways, through their default values and through setters 65 defined in those graphical types 51. A setter 65 can be used to initialize a non-contained attribute 63, like one that is inherited or defined on a nested or composed type 31. The values of those attributes, and how these building blocks are composed, is what controls the rendering result (painting logic) at the end.

Figure 6:
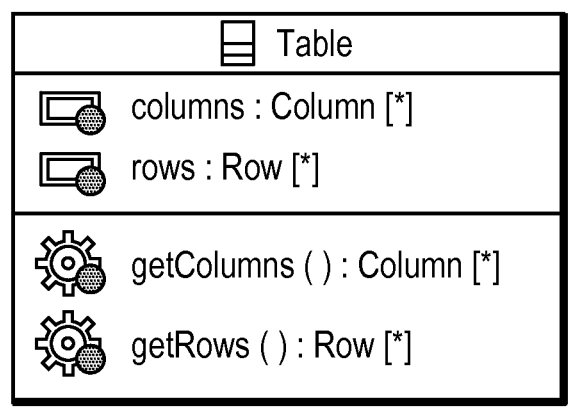
FIGS. 6, 8 and 10 are schematic illustrations of an example UML Class Shape (figure) specification (FIGS. 6 and 8) and mapping (FIG. 10) using the present invention declarative DG system.

To better visualize the way DG 110 graphics can be used to specify graphics (concrete syntax) declaratively, consider the example of a UML Class shape 67 shown in FIG. 6. The shape can be described (declaratively specified as at 67) as a rectangle that has a label followed by two compartments each one of them has two labels. The shape's label appears to be centered in the rectangle width while the attribute and operation labels appear to be flushed to the right of the compartment width.

Figure 7:
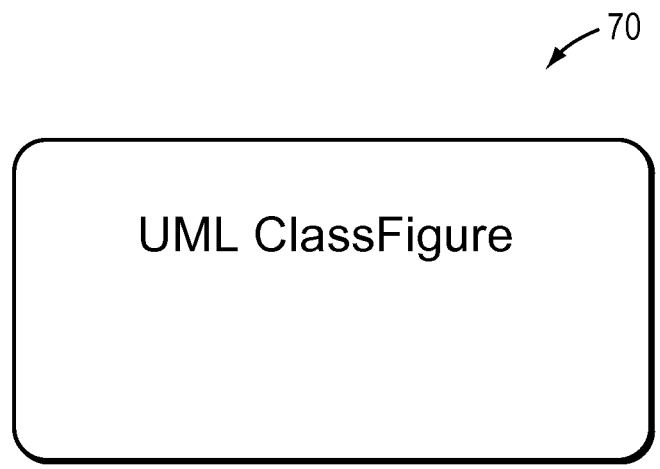
FIG. 7 is an illustration of a less efficient Specification (not by the present invention) of the UML Class figure of the example of FIG. 6.

One way to define this shape is by using a single figure that knows how to render the whole shape, as shown at 70 in FIG. 7. This means the figure would define attributes that control the various aspects of painting, layout, text values . . . etc. It would also have to define painting logic and layout logic for the shape as a whole. Although this specification is possible, it is not efficient when the shape is complex or when it is part of a large set of other shapes that share similar rendering requirements. Although this problem could get alleviated by the use of inheritance if the shapes logically extend each other, more often than not, the problem does not render itself naturally to inheritance but rather to composition.

Another more efficient way to think of this shape's definition (graphical specification) 67 is by decomposing it into smaller building blocks (graphing units or graph elements). Consider the decomposition shown in FIG. 8. The main UML Class shape (a figure 53 generally) knows how to paint the rectangle shape and border. The example UML Class figure 67 is formed of three children figure 53: namely, a text label 181 and two compartment figures 183, 185. A compartment figure 183, 185 knows how to paint a separator at the top. Each one of those two compartments 183, 185 comprises two respective text labels 187a, b. Labels 187a, b know how to paint a given text. This pretty much takes care of painting in a composite way.

For the layout 55, notice that the example UML Class shape defines a XYLayoutData 189, which gives it the bounds (position and size) expected by its parent figure 37, layout 55 (the diagram figure has an XYLayout). The example shape also defines a ToolbarLayout 180 to lay its label 181 and two compartments 183, 185 figures. The vertical attribute 63 of this layout 180 is set to 'true' and the alignment attribute 63 is set to 'center'. This positions the label in the center of the shape's 67 width and gets the three child figures 181, 183, 185 to stack on top of each other.

Next, each compartment element 183, 185 also defines a ToolbarLayout 184 to layout its labels 187a, b. The vertical attribute 63 on the layout 184 is also set to 'true' but the alignment attribute 63 is set to 'left' this time. This causes the child labels 181a, b to stack on top of each other and flush to the left of the compartment's 183, 185 width.

The advantage of this last specification 67 over the one in FIG. 7 is obvious. It allows for a great amount of reuse and decoupling between the building blocks. It allows for building libraries of those building blocks to reuse in quickly building more complex graphics for a given domain. In addition, every domain can define its own building blocks with graphical idioms known to its users (e.g. compartment for UML modelers, Table for data modelers, Circuit for chip designers . . . etc).

Mapping Types

In the previous section, the "view" component 11 of the MVC architecture 100 is discussed. This section discusses the "controller" component 15, i.e. the mapping from the model 13 to the view 11. The model 13 here is represented by a domain's abstract syntax (metamodel) along with its diagram syntax 23 (DI metamodel). User models 13 are created according to the rules of these syntaxes 21, 23. On the other hand, the view 11 here is represented with a domain's graphics syntax 17 (DG library) of the present invention. The idea of DG mapping 19 is to specify how these syntaxes 17 and 21, 23 map to each other.

Figure 9:
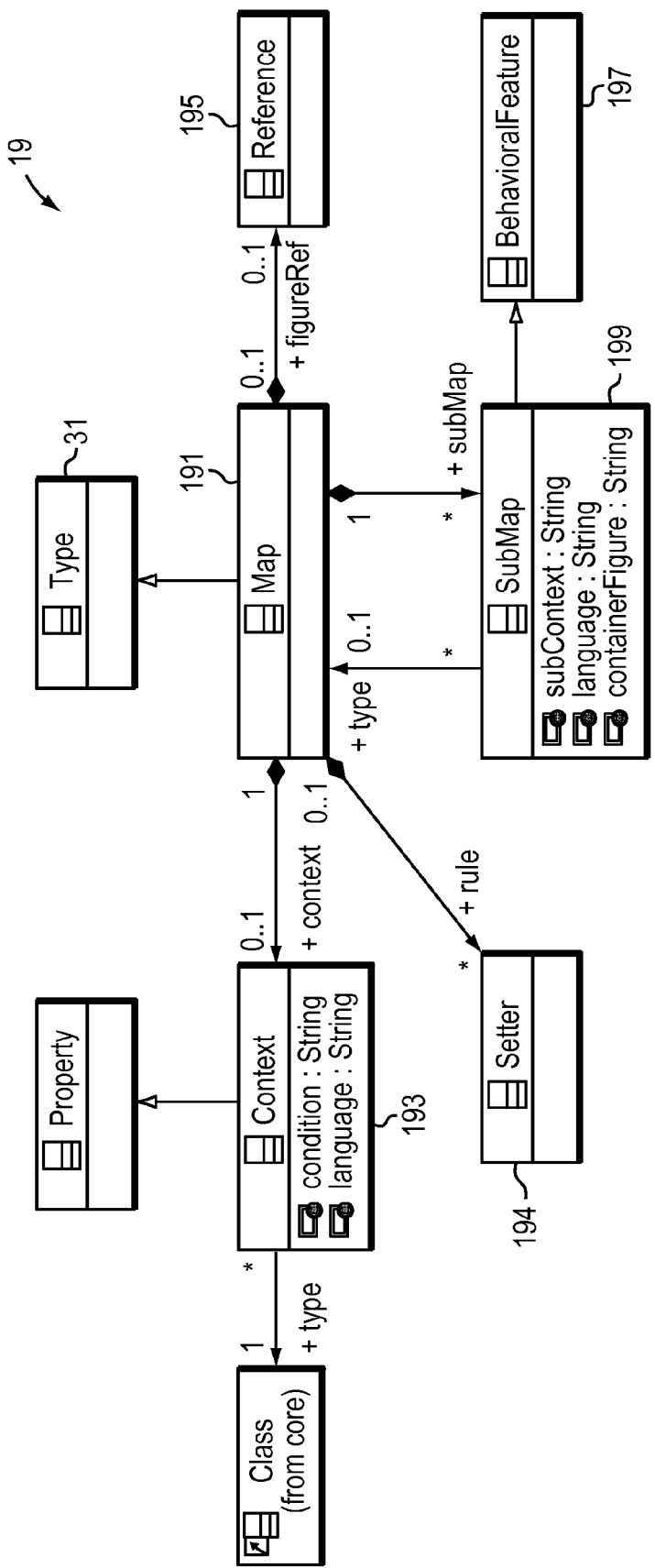
FIG. 9 is a metamodel diagram of the invention DG mapping.

FIG. 9 shows the invention DG mapping engine 19 metamodel. The main abstraction in DG mapping engine 19 that corresponds to a controller 15 in the MVC architecture 100 is that of a map 191. A map 191 is defined as a type 31 whose structure consists of two very expected components (shown at 193, 195). The first component (at 193) represents the map's model 13 side, and the second component (at 195) represents its view 11 side. A map's 191 model side is defined with a context 193 property that has a type and a condition. A context 193 property extends a normal property by redefining the type to only be a MOF-based metaclass and by adding a filter condition in the context of that metaclass. The type and condition of a map's context 193 prescribe the kind of model element the map 191 is applicable to. On the other hand, a map's view side is defined with a composed reference 195 to a figure 53. This referenced figure 53 prescribes the concrete syntax block (graphical building block element, e.g., 181, 183, 185, 187) to map the context 193 element to.

The first step of the invention mapping process 19 is that a context model element (the model 13 element corresponding to a context component 193 of map 191) is bound to the map's context property 193 after having satisfied the context's type and condition. After that, the logic of the mapping 19 itself is carried out. That logic is specified using the map's behavioral features 197, namely its rules and sub maps 199. A rule is a setter 194 that assigns values derived from the map's context 193 to attributes defined on the figure 53 structure. This effectively populates the structure of the map's figure 53 (view 11 side of main architecture 100) with data from the context 193 model element (model 13 side).

On the other hand, a sub map 199 represents an invocation of a nested map 191 with a sub context 193, which is a collection of elements derived from the map's context model element. A separate map 191 invocation is made for each element in the sub context 193. A sub map 199 does not specify a specific map 191 to invoke; rather the chosen map 191 is the most specific map (in the inheritance sense) that is applicable to the sub context 193 element. To limit the selection process, a sub map 199 can optionally specify a super type for maps 191 to invoke. Each sub map 199 invocation for an element of the sub context 193 results in a corresponding map 191 being invoked. The populated figure 53 of this invoked map 191 gets added as a nested child figure in the container map's figure. The default is to nest that figure 53 as direct child of the container map's figure, although this can be changed by specifying a different nested container figure. Executing all sub maps 199 effectively updates the nested figure 53 hierarchy of the container map's figure.

One advantage of sub maps 199 is to allow for the decomposition of a map 191 definition into building blocks. Instead of specifying one complex map of a complex element to a complex figure, simple maps 191 can be specified first using rules then those maps 191 get composed together using sub maps 199 to form more complex maps.

It is important to realize that mapping models 13 to their graphical representation 17 (view 11) involves mapping information from both the semantic and the diagram parts of the model 13 to that graphical representation. Since diagrams (diagram syntax 23) reference their semantic context (abstract syntax 21) and not vice versa, diagram elements (DI building blocks) 21, 23 are usually the starting contexts for the mapping 19. In fact, to map a complete diagram 21, 23 to its graphics 17, the diagram itself is typically used as the root context element in the mapping 19.

Figure 8:
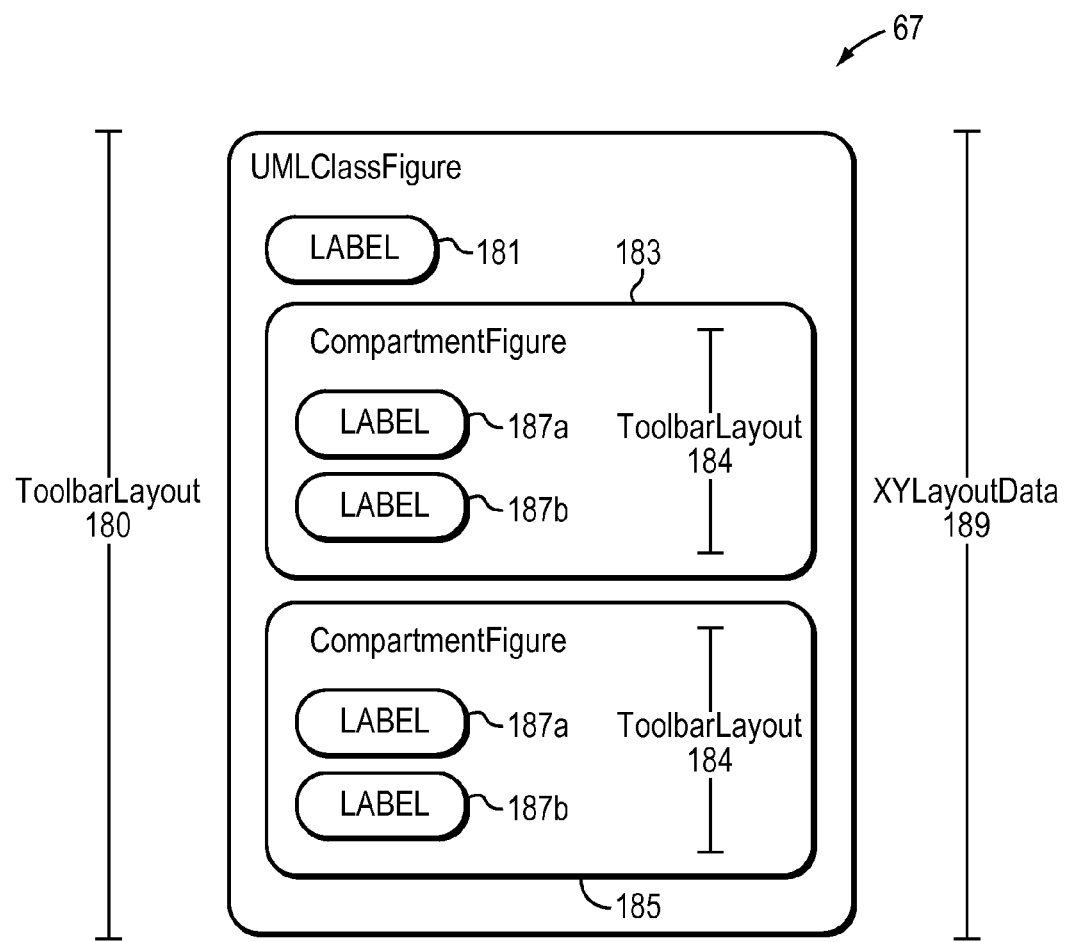

To visualize how the invention DG mapping 19 can be used to define declarative graphics (concrete syntax) specifications and maps between context model 13 elements and their graphics 17 (corresponding graphical view 11), consider the class shape example introduced in FIGS. 6 and 8. In that example, the figure hierarchy shown at 67 in FIG. 8 depicts the result of mapping 19 a specific UML Class shape to its figure 53. However, the maps 191 used to produce this result capture the general pattern of mapping 19 UML Class shapes to their figure 33.

One way to approach designing such mapping 19 is to define it using a single map 191. The map's context 193 is specified to be a DI Node that references UML Class 67. This ensures that the map's context 193 is that of a UML class node. This gives access to the node itself, and from it access to its compartment 183, 185 nodes and its context 193 (the UML Class). Now, the figure side of this map 191 needs to be separately specified. The specification can look like the one in FIG. 8, except that the number of labels inside each compartment 183, 185 is unknown because it depends on the number of attributes and operations in the UML Class (the first problem in the background section).

Additionally, the class node 67 has two compartments 183, 185 that look very similar except that one contains the attributes and one contains the operations of the class. Using the current approach of one map 191 for the whole shape, a good number of rules for populating these two compartments 183, 185 (e.g. the compartment style rules) would be repeated leading to a bloated map design. Finally, if another shape (e.g. the interface shape) that looks close to the class shape needs to be mapped, a good number of the mapping rules would need to be duplicated in both maps.

Accordingly, such an approach is not going to work easily or scale well. Also, it is not practical given that a good number of figure 53 cannot be statically defined since they depend on the state of the context 193 model element. The alternative approach is much more intuitive and flexible. It allows this one big map 191 to be decomposed into several reusable building blocks (graph elements or units). The first building block is a map 191*a* (FIG. 10) for the UML Class node 101 only. It maps the UML Class node 101 to its UML class figure 67, which can be defined to compose the static singular children of the figure only, i.e. the name label 181 and not the compartment figures 183, 185.

The second building block is a map 191*b* for the compartment node 103. Since both compartments 183, 185 share a lot of the mapping rules 194, an abstract compartment node map 191*b* is defined to map a compartment node 103 to a compartment figure 183, 185. This map 191*b* can be extended to define attribute and operation compartment maps 191(*b*1) and 191(*b*2) that map an attribute compartment node 105 and/or operation compartment nodes 104 to a compartment figure 183, 185. Respective sub maps 199 are utilized.

The third building block is a map 191*c* for a UML attribute property 106 and a map 191*d* for a UML operation 109. These maps 191*c*, *d* are defined to map these elements 106, 109 to their text label figure 187*a*, *b*.

Figure 10:
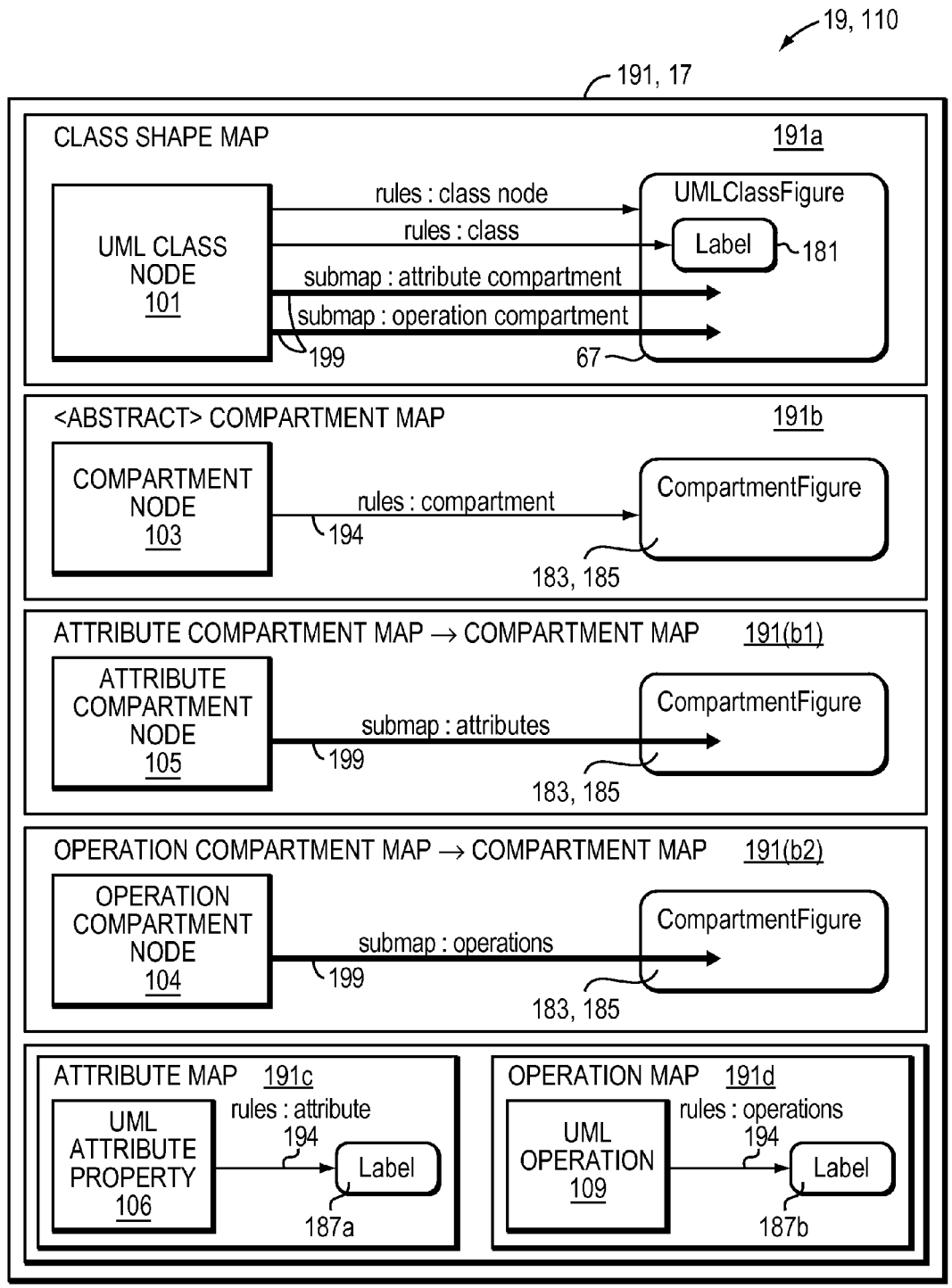

Finally, mapping engine 19/system 110 compose those maps 191*a*, *b*, *c*, *d* (building blocks/graphing units) together resulting in UML Class figure map 191 and declarative specification of graphical concrete syntax 17. The class node only map 191*a* defines sub maps 199 for the attribute and operation compartments. These sub maps 199 pass the attribute and operation compartment nodes 104, 105 as sub context 193. Similarly, the attribute and operation compartment maps 191(*b*1), 191(*b*2) define sub maps 199 for the attributes and operations labels 187*a,b*, respectively. These sub maps 199 pass the class's nested attributes 106 and operations 109. The final mapping definition is illustrated in FIG. 10 and sample code specification is in the below exemplification.

One embodiment of the invention DG system 110 is as follows (i.e., employs the following definitions).
  Class Descriptions
    NamedElement 39
A named element is an element that has a name.
NamedElement is an abstract metaclass.
    Generalizations
None
    Attributes
Name: String [1 . . . 1]
The name of the named element.
    Constraints
None
    Package 37
A package is a named element that represents the root of containment in a DG model library. A package contains all the types in the model and is considered a namespace for them.
    Generalizations
NamedElement
    Attributes
Type: Type [0 . . . *]
Contains a list of all types in the DG model library.
    Constraints
None
    Type 31
A type 31 is a named element 39 that has a unique name within its container package 37, a structure and a behavior. The structure of a type 31 is defined with a collection of structural features 35, while the behavior is defined with a collection of behavioral features 33. The names of the structural features 35 have to be unique within their container type 31. The same restriction applies to behavioral features 33. A type 31 is an abstract metaclass that get subclassed by more specialized metaclasses.

Both the structural and behavioral feature collections 33,35 are derived unions that get subsetted throughout the type 31 hierarchy. In fact, one concrete collection that subset the structural features collection 35 in all types 31 is the alias collection. Aliases are read-only derived properties that allow for creating named shortcuts to otherwise verbose expressions that are used by the type's behavioral features 33.

A type 31 can be defined as abstract or concrete. An abstract type is incomplete and cannot be instantiated while a concrete type is complete and can be instantiated. Types 31 can also extend each other to form an inheritance hierarchy. Only single inheritance is allowed between types 31. A sub type inherits both the structure and the behavior of its super type. The inheritance semantics allows refinement of both structure and behavior. This means a sub type can define structural or behavioral features 33, 35 that refine similarly named ones in similar collections defined by other types 31 in the super type chain. The exact semantics of refinement for each kind of structural and behavioral features 33, 35 is discussed in their own sections.
    Generalizations
NamedElement
    Attributes
    abstract: Boolean [0 . . . 1]
A boolean value that specifies whether the type 31 is abstract. The default is 'false' meaning non-abstract (i.e. concrete).
    package: Package [1 . . . 1]
References the package that contains this type 31.
    superType: Type [0 . . . 1]
References an optional super type of this type 31.
    /structuralFeature: StructuralFeature [0 . . . *]
References a derived union of structural features 35 contained by this type 31.
    /behavioralFeature: BehavioralFeature [0 . . . *]
References a derived union of behavioral features 33 contained by this type 31.
    alias: Alias [0 . . . *]
Contains a list of alias owned by this type.
The list subsets Type::structuralFeature.
    Constraints
The type's inheritance hierarchy must be directed and acyclic. A type 31 cannot be both a transitively super and transitively sub type of the same type 31.
    StructuralFeature 35
A structural feature is a named element 39 that represents part of the structure of its container type 31. A structural feature is an abstract metaclass that is subclassed by other more specialized metaclasses.
    Generalizations
NamedElement
    Attributes
/containerType: Type [1 . . . 1]
References the type 31 that contains this feature. The reference is derived.
    Constraints
The name of the structural feature 35 must be unique within its container type 31.
    Behavioral Feature 33
A behavioral feature 33 is a named element 39 that represents part of the behavior of its container type 31. A behavioral feature is an abstract metaclass that is subclassed by other more specialized metaclasses.
    Generalizations
NamedElement
    Attributes
/containerType: Type [1 . . . 1]

References the type 31 that contains this feature. The reference is derived.
Constraints
The name of the behavioral feature 33 must be unique within its container type 31.
Property 41
A property 41 is a kind of structural feature 35 that is typed with a MOF-based classifier. This means a property 41 can be typed with a MOF-based data type or class. In the case of a class type, a property 41 represents a non-containment reference 43 to an instance typed with that class. When a property refines another property from a super type, its type must be the same as or a sub type of the refined property's type. A property 41 is an abstract metaclass that is subclassed by other more specialized metaclasses.
Generalizations
StructuralFeature 35
Attributes 45
type: core::Classifier [1 . . . 1]
References a MOF-based classifier representing the type of this property 41.
Constraints
A refining property must have the same type or a sub type of a refined property's type.
Alias 47
An alias 47 is kind of property 41 that is derived and read-only. Its main purpose is to serve as a named shortcut to an otherwise verbose expression used by the container type's behavioral features 33. The expression is in the context of the container type (i.e. has access to the type's structural features 35) and is specified using a given query language (OCL is the default). The alias 47 also specifies whether it represents a single or a collection of data. When an alias refines another alias from a super type, it overrides the refined alias's expression, language and collection settings.
Generalizations
Property
Attributes
expression: String [1 . . . 1]
An expression that is specified in the context of the container type using the given query language.
language: String [0 . . . 1]
A query language used to specify the expression. It is optional with a default of OCL.
collection: Boolean [0 . . . 1]
A boolean value that determines whether the alias 47 has a collection type. Default is false.
Constraints
The alias's expression must have a compatible (same or sub) type and multiplicity to that of the alias 47.
The alias 47 may only refine another alias from the super type chain.
A refining alias must have a similar collection value to that of the refined alias.
Attribute 45
An attribute 45 is a kind of property 41 that can be read or written. It represents a holder of data that is used by the container type in carrying out its function. An attribute 45 can only be typed with a singular primitive type and has an optional default value. When an attribute 45 refines another attribute from a super type, it overrides the refined attribute's default value.
Generalizations
Property
Attributes
default: String [0 . . . 1]
An optional default value of the attribute.
type: core::PrimitiveType [1 . . . 1]
References a MOF-based primitive type representing the type of this attribute.
Redefines Property::type.
Constraints
The default value of the attribute 45 has to be a literal that is compatible with the attribute's type.
The attribute may only refine another attribute from the super type chain.
Reference 43
A reference 43 is a kind of structural feature 35 that is typed with a DG type. A reference 43 represents a composition of an instance of its type inside of an instance of its container type. When a reference 43 refines another reference from a super type, its type must be the same as or a sub type of the refined reference's type.
Generalizations
StructuralFeature
Attributes
type: Type [1 . . . 1]
References a DG type representing the type of this reference.
Constraints
A refining reference 43 must have the same type or a sub type of a refined reference's type.
The reference 43 may only refine another reference from the super type chain.
Setter 49
A setter 49 is a kind of behavioral feature 33 that assigns a value to an attribute 45. The attribute 45 is specified by its path from the setter's context instance. If an attribute is defined on the setter's context instance, the path is the simple name of the attribute (e.g. "text"). However, if an attribute 45 is defined in a nested instance, the path is additionally prefixed with a dot-separated concatenation of the names of the nested references leading to that instance (e.g. "compartment.label.text").
The value assigned to an attribute is specified with an expression. The expression is in the context of the setter's container type (i.e. has access to the type's structural features 35) and is specified using a given query language (OCL is the default).
When a setter 49 refines another setter from a super type, it must have the same attribute name as the refined setter but it overrides the refined setter's expression and language settings.
Generalizations
behavioralFeature
Attributes
attribute: String [1 . . . 1]
The qualified (dot-separated) path to an attribute accessible from the structure of the setter's container type.
expression: String [1 . . . 1]
The value expression of the setter specified in the context of its container type using the given query language.
language: String [0 . . . 1]
The query language used to specify the value expression. It is optional with a default of 'OCL'.
Constraints
A setter 49 cannot have a similar attribute name except to other setters it refines throughout the super type chain.
The setter's expression must have a conforming (same or sub) type to the attribute's type.
The setter may only refine another setter from the super type chain.

The setter's attribute must specify a valid path to an attribute in the container type.

GraphicalType 51

A graphical type 51 is a type 31 that designates a graphics related concept. It is an abstract metaclass that is further subclassed with more specialized metaclasses. A graphical type 51 extends its structure with a collection of attributes 63 that hold data that is significant to the function of the type. It also extends its behavior with collection of setters 65 that initialize attributes in the type's structure.

The collection of initializers is ordered. While refining initializers override refined ones and hence take their respective order, other non-refining initializers are ordered after inherited ones.

Generalizations
Type
Attributes
attribute: attribute [0 ... *]
Contains a list of attributes 63 contained in this type. The list subsets Type::structuralFeature.
initializers: Setter [0 ... *]
Contains a list of setters 65 that initialize the structure of this type. The list subsets Type::behavioralFeature.
Constraints
None
Figure A figure 53 is a graphical type 51 that represents a building block for declaratively defining graphics (the concrete syntax). A figure 53 also represents a unit of graphical rendering in a drawing surface. Every figure 53 knows how to render (paint) itself within its bounds. The figure's bounds is a rectangular area, inside which the figure paints its contents and outside which the rendering is clipped.

Although a figure 53 does not declaratively define its rendering logic, it does however define parameters that controls that logic. For example, a figure 53 that paints a rectangle in its bounds does not define the sequence of strokes to draw the rectangle, but instead defines parameters that is important for drawing a rectangle such as its position, size, colors, line attributes ... etc. A figure 53 defines its controlling parameters as attributes in the figure with appropriate types and defaults.

figure 53 can be nested to form more complex figures. A figure 53 defines its nested child figures with composite references 61 to other figure 53. Every child figure has a unique name representing the role played by that child in its parent figure 53. A parent figure sets the bounds of its child figures relative to its own bounds using a layout 55 algorithm. A figure 53 defines its layout algorithm with a composite reference to a layout (another graphical type). If a layout algorithm defined on a parent figure is a constrained layout algorithm (i.e. it uses layout constraints provided by child figures for its function), child figures of that parent must also define suitable layout constraints for this layout algorithm. A figure 53 defines its layout constraint with a composite reference to a layout data 57 (another graphical type).

Generalizations
GraphicalType
Attributes
childRef: Reference [0 ... *]
Contains a list of composite references 61 that are typed with a figure 53 and represent child figures of this parent figure.
layoutRef: Reference [0 ... 1]
Contains an optional composite reference 61 that is typed with a layout 55 and represents a layout algorithm defined on this parent figure.
layoutDataRef: Reference [0 ... 1]
Contains an optional composite reference 61 that is typed with a layout data type 57 and represents a layout data defined on this child figure.
Constraints
Each childRef reference 61 must have type that is a figure 53.
The layoutRef reference 61 must have type that is a layout 55.
The layoutRef reference 61 must have a name equal to 'layout'.
The layoutDataRef reference 61 must have type that is a layout data 57.
The layoutDataRef reference 61 must have a name equal to 'layoutData'.
The layout data 57 defined on child figures must be the same as or a sub type of the layout data referenced by the layout defined on this figure 53.
Connection 59

A connection 59 is a special kind of figure 53 that renders as a polyline (a multi-segment line). A connection 59 has its start anchored relative to a source figure and its end anchored relative to a target figure. The line segments of a connection 59 are defined with a sequence of relative points to those anchors that a connection 59 has to route through.

Generalizations
Figure
Attributes
None
Constraints
None
Layout 55

A layout 55 is a graphical type 51 that represents a layout algorithm that sets the bounds of child figure 53 relative to the bounds of their parent figure 53. Many layout algorithms are widely known today and are implemented by popular graphics frameworks. Layouts 55 can have parameters that control their function. A layout defines its controlling parameters as attributes in the layout with appropriate types and defaults.

In addition, some layout algorithms require child figures to define suitable layout data 57 to properly function. The expected type of those layout data can optionally be specified by a pointer to a layout data 57 (another type in DG system 110).

Generalizations
GraphicalType
Attributes
layoutData: LayoutData [0 ... 1]
References an optional layout data 57 that represents the expected type to be defined on child figure 53.
Constraints
None
Layout Data 57

A layout data 57 is a graphical type 51 that represents a constraint on a layout algorithm. Some layout algorithms require child figures to define a layout data as a constraint for their function. Layout data 57 usually have parameters that define them. A layout data 57 defines its parameters as attributes with appropriate types and defaults.

Generalizations
GraphicalType
Attributes
None
Constraints
None
Map 191

A map 191 is a type that specifies a correspondence from a model element to its graphical representation. The model element is defined with a context property that specifies a MOF-based class as a type of the element along with a condition in the context of that type. A map 191 is considered applicable to an element if the element is an instance of the map's context type and satisfies the map's context condition. The graphical representation of an element is defined with a composed reference 195 to a figure 53 in the map. Both the map's context property 193 and figure reference 195 extend the map's structural features. Although both are optional, a concrete map must define them either directly or through inheritance.

The details of the correspondence from a map's model 13 element to its figure 53 is defined by extensions to the map's behavior. The first kind of correspondence is provided by a collection of setters 194 representing the map's rules. These rules assign values derived from the map's context (model 13) element to properties accessible on its figure 53.

The second kind of correspondence is provided by a collection of sub maps 199 that represent invocations of nested maps 191 with sub contexts 193 derived from the parent map's context. The purpose of those sub maps 199 is to recursively add nested figure 53 that correspond to sub context 193 elements derived from the current context element. The idea is that if every map 191 specified its direct sub contexts, the whole figure 53 hierarchy can be built recursively to produce the complete graphical representation of the model 13 element.

Both collections of rules and sub maps 199 in a map 191 are ordered. While refining rules and sub maps override refined ones and hence take their respective order, other non-refining rules and sub maps are ordered after inherited ones. Nevertheless, all rules' and sub maps' specification logic have to remain independent of their relative order. This reduces coupling between these rules and sub maps and enhance the possibility for efficient incremental update algorithms.

Generalizations
Type
  Attributes
    context: Context [0 ... 1]
Contains an optional context property 193 that represents this map's context model element. The context subsets Type::structuralFeature.
    figueRef: Reference [0 ... 1]
Contains an optional composite reference 195 that is typed with a figure 53 and represents this map's figure. The reference subsets Type::structuralFeature.
    rules: Setter [0 ... *]
Contains a list of setter rules that specify the correspondence between this map's context element and its figure's structure. The list subsets Type::behavioralFeature.
    subMap: SubMap [0 ... *]
Contains a list of sub maps 199 that represent invocations of nested maps 191 with sub contexts derived from this map's context 193. The list subsets Type::behavioralFeature.
  Constraints
    The map's context 193 must have a name equal to 'context'.
    The map's figureRef must have a name equal to 'figure'.
    The map's figureRef must have type that is a figure 53.
    A concrete map must have a defined context 193 and figure reference 195 either directly or through inheritance.
Context 193
A context 193 is a kind of property that is typed with a singular MOF-based class and specifies an optional condition in the context of that class using a query language (OCL is default). The object that gets assigned as a value to the context must be an instance of its type and satisfies its condition. When a context refines another context from a super type, its condition is logically AND-ed to the refined context's condition.

Generalizations
Property
  Attributes
    condition: String [0 ... 1]
An optional boolean expression in a given query language representing a condition on the context's value.
    language: String [0 ... 1]
A query language used to specify the condition. It is optional with a default of OCL.
    type:core::Class [1 ... 1]
References a MOF-based class representing the type of this context. Redefines Property::type.
  Constraints
    The condition expression of the context has to be of type Boolean.
    The context may only refine another context from the super type chain.
SubMap 199
A sub map 199 is a kind of behavioral feature 197 that represents invocations of nested maps 191 in the context 193 of its container map. A sub map 199 defines a sub context expression in the context of its container map using a query language (OCL is default). The sub context expression derives a collection of zero or more model elements from the container map's context model element.

A sub map 199 does not specify a particular map 191 to invoke; instead a map 191 is chosen that best suits each sub context element. A chosen map is the most specific (in the inheritance sense) available map 191 that is applicable to the sub context element (where applicability means the context element is an instance of the map's context type and satisfies its context condition). A sub map 199, however, can optionally specify a map 191 as a type, which represents the super type of candidate invocable maps, in order to restrict the selection scope.

It is important to realize that for this process to work, inherited maps from the same map should be defined with exclusive contexts, otherwise the risk of finding two candidate maps to invoke would arise. To remove the randomness from the process, when such a situation arises, instead of choosing one of the inherited maps to invoke, the parent map would be chosen. If no such map is found or if the parent is abstract, the sub context element is ignored. However, if such a map 191 is found, it gets invoked by binding the sub context element as the invoked maps's context.

The figure 53 of those invoked maps 191 get appended by default as direct children of the container map's figure 53. However, if the sub map's figure need to be inserted as a child of another nested container figure, a path to this container figure can be specified in the sub map 199. The path is dot-separated concatenation of the names of the nested figure 53 up to that container figure 53.

When a sub map 199 refines another sub map from a super type, it overrides its subContext, language and containerFigure settings.

Generalizations
BehavioralFeature
  Attributes
    subContext: String [1 ... 1]
The sub context expression of the sub map specified in the context of its container map using the given query language.
    language: String [0 ... 1]

The query language used to specify the subContext expression. It is optional with a default of 'OCL'.
containerFigure: String [1 . . . 1]
The optional qualified (dot-separated) path to a container figure nested inside the container map's figure. When not specified, the figure 53 of container maps 191 is defaulted.
type: Map [0 . . . 1]
References an optional map 191 representing the super type of invocable maps.
Constraints
The sub map's container figure must specify a valid path to a nested figure in the map's figure.
The sub map's expression must have a type that is a MOF-based class.
The sub map 199 may only refine another sub map from the super type chain.
The sub map's expression must have a type that matches the type of the sub map's type's context.
Exemplification
The present invention system 110 as applied to UML (Unified Modeling Language) is illustrated in the following sample code (declarative description).

Sample UML Layouts

```
layout XYLayout
{
}
layoutdata XYLayoutData
{
    property x: Integer = "0";
    property y: Integer = "0";
    property width: Integer = "−1";
    property height: Integer = "−1";
}
layout FlowLayout
{
    property vertical: Boolean = "false";
}
layoutdata FlowLayoutData
{
    property ratio: Double = "−1";
}
```

Sample UML Figures

```
abstract figure Shape
{
    property fill: Boolean = "true";
    property outline: Boolean = "true";
    property lineStyle: String = "solid";
}
figure Rectangle extends Shape
{
}
figure ClassifierShape extends Rectangle
{
    layout: FlowLayout [vertical = "true"];
    layoutdata: XYLayoutData;
    child stereotype: Label;
    child name: Label;
    child package: Label;
}
figure Compartment extends Shape
{
    property title: String;
    property showTitle: Boolean = "false";
    property collapsed: Boolean = "false";
}
figure ListCompartment extends Compartment
{
    layout: FlowLayout [vertical = "true"];
}
```

```
figure Label
{
    property text: String;
    property bold: Boolean = "false";
    property italic: Boolean = "false";
    property underline: Boolean = "false";
}
```

Sample UML Shape Mapping

```
abstract mapping UMLShapeMapping
{
    context: di::Node condition ("isDefinedBy(umldd::UMLShape)");
    figure: Shape [layoutdata.x = "context.getStyle('x') ",
        layoutdata.y = "context.getStyle('x')",
        layoutdata.width = "context.getStyle('x')",
        layoutdata.height = "context.getStyle('x')"];
}
abstract mapping ClassifierShapeMapping extends UMLShapeMapping
{
    context: di::Node condition ("isDefinedBy(umldd::ClassifierShape)");
    property classifier: uml::Classifier = "context.element.oclAsType(uml::Classifier)";
    figure: ClassifierShape [stereotype.text =
"' « '+classifier.getAppliedStereotypes( )->iterate(s:String="|s+name+
',')+'» '",
        name.text = "classifier.name",
        name.italic = "class.abstract",
        package.text= "'from (' +
        classifier.namespace.name) + ')'"];
    childmap attributeCompartment subcontext
("context.getChildDefinedBy(umldd::AttributeCompartment)"):
AttributeCompartmentMapping;
    childmap operationCompartment subcontext
("context.getChildDefinedBy(umldd::OperationCompartment)"):
OperationCompartmentMapping;
}
mapping ClassShapeMapping extends ClassifierShapeMapping
{
    context: di::Node condition ("isDefinedBy(umldd::ClassShape)");
}
```

Sample UML Compartment Mapping

```
abstract mapping UMLCompartmentMapping
{
    context: di::Node condition
        ("isDefinedBy(umldd::UMLCompartment)");
    figure: Compartment [layoutdata.ratio = "context.getStyle('ratio')",
        showTitle = "context.getStyle('showTitle')",
        collapsed = "context.getStyle('collapsed')"];
}
mapping AttributeCompartmentMapping extends
UMLCompartmentMapping
{
    context: di::Node condition
("isDefinedBy(umldd::AttributeCompartment)");
        figure: ListCompartment [title = "'Attributes'"];
        childmap attributes subcontext
("context.parent.element.oclAsType(uml::Classifier).attributes"):
AttributeLabel;
}
mapping AttributeLabel
{
    context: uml::Property;
    figure: Label [text = "context.name + ':' + context.type.name)"];
}
```

Figure 11:
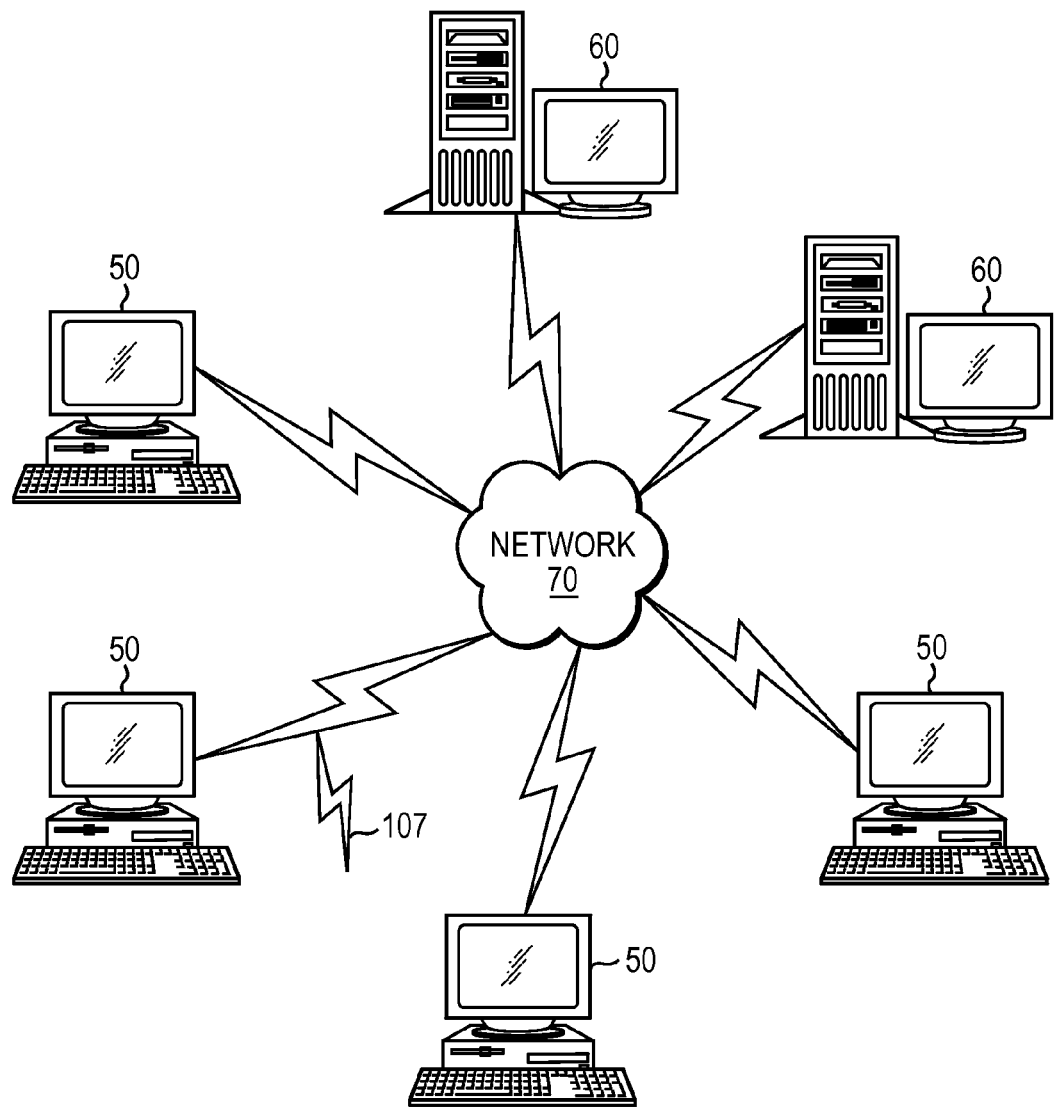
FIG. 11 is a schematic view of a computer network environment in which embodiments of the present invention are employed.

FIG. 11 illustrates a computer network or similar digital processing environment in which the present invention may be implemented.

Client computer(s)/devices 50 and server computer(s) 60 provide processing, storage, and input/output devices executing application programs and the like. Client computer(s)/ devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 12:
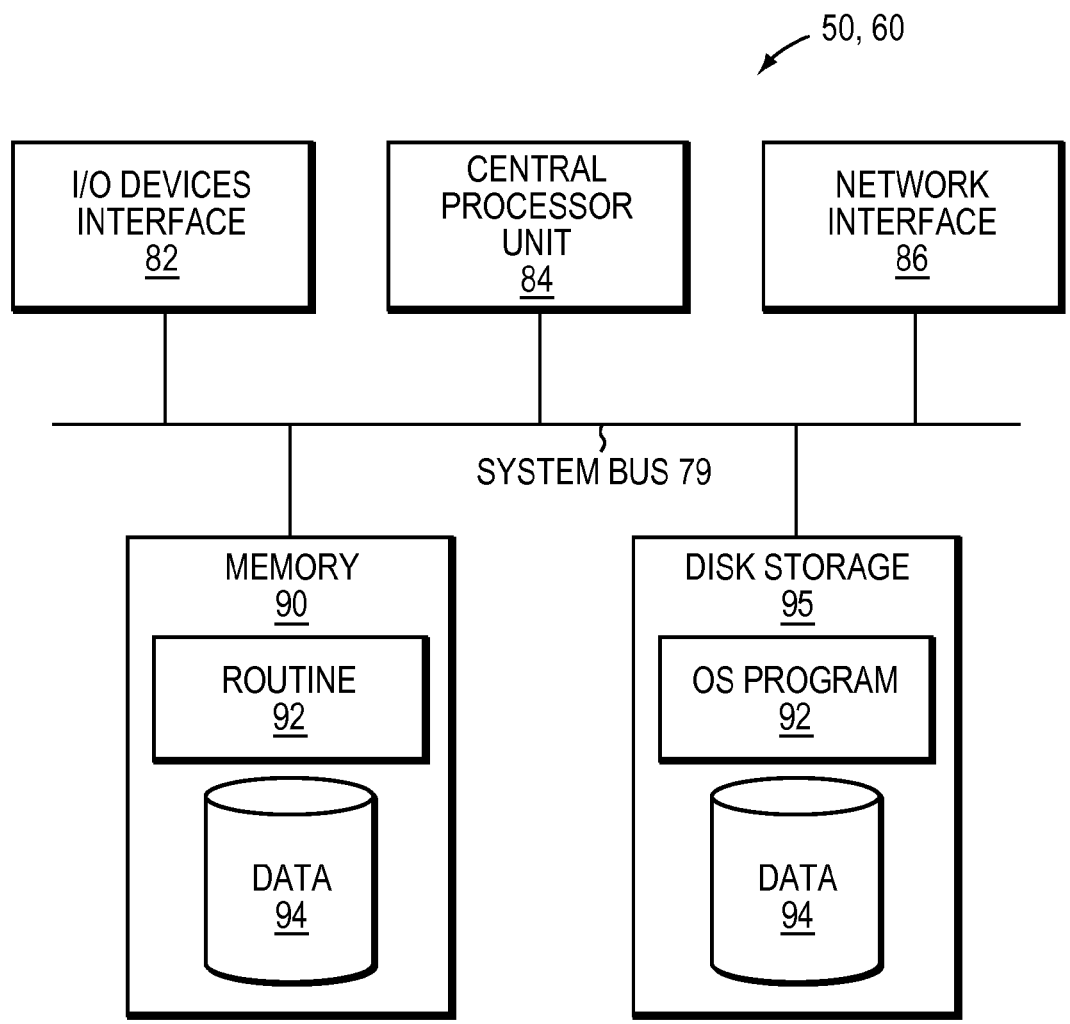
FIG. 12 is a block diagram of a computer node in the network of FIG. 11.

FIG. 12 is a diagram of the internal structure of a computer (e.g., client processor/device 50 or server computers 60) in the computer system of FIG. 11. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 11). Memory 90 provides volatile storage for computer software instructions 92 and data 94 used to implement an embodiment of the present invention (e.g., graphical concrete syntax specification generator 110, 17, declarative descriptor/generator 17, 100, diagram graphics mapping engine 19, methods and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While this invention has been particularly shown and described with references to example embodiments thereof, it will be understood by those skilled in the art that various changes in form and details may be made therein without departing from the scope of the invention encompassed by the appended claims.

For example, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-based method of specifying concrete syntax of a graphical modeling language, comprising:
    using a graphical modeling language having: an abstract syntax, a graphical concrete syntax and a diagram interchange syntax, the graphical concrete syntax being graph elements that constitute surface notation and that map to abstract syntax and diagram interchange syntax counterparts;
    in a main architecture, having a model defined in terms of the graphical modeling language, by the abstract syntax and the diagram interchange syntax, the abstract syntax being defined by industry standard and the diagram interchange syntax being defined by industry standard;
    defining a graphical representation of the model resulting in a diagram of the model, said defining being by providing a declarative description of the graphical concrete syntax of the diagram of the model; and
    modeling a structured mapping between (i) the graphical concrete syntax of the diagram and (ii) the abstract syntax and the corresponding diagram interchange syntax of the model,
    wherein the provided declarative description and modeling specifies the graphical concrete syntax of the graphical modeling language in a formal manner that enables unambiguous and complete specification of the graphical modeling language.

2. A method as claimed in claim 1 wherein providing the declarative description includes modeling graphical building blocks that form the graphical concrete syntax.

3. A method as claimed in claim 2 wherein the structured mapping is between (i) the graphical building blocks and (ii) the abstract syntax and the corresponding diagram interchange syntax of the model.

4. A method as claimed in claim 1 wherein the modeling includes utilizing a declarative description of the structured mapping.

5. A method as claimed in claim 4 wherein the declarative descriptions employ a diagram graphics language having a figure type.

6. A method as claimed in claim 5 wherein the diagram graphics language further includes:
    a layout type enabling representation of layout algorithms; and
    a layout data type enabling representation of attributes.

7. A method as claimed in claim 6 wherein values of the attributes may be set by default.

8. A method as claimed in claim 5 wherein figures of the figure type may be nested.

9. A method as claimed in claim 4 wherein the declarative descriptions effectively define structure of the graphical concrete syntax rather than a rendering logic of the graphical concrete syntax.

10. A computer system specifying concrete syntax of a graphical modeling language, comprising:
    a main architecture using a graphical modeling language having: an abstract syntax, a graphical concrete syntax and a diagram interchange syntax, the graphical concrete syntax being elements that constitute surface notation and that map to abstract syntax and diagram interchange syntax counterparts, and the main architecture having a model defined by the abstract syntax and the diagram interchange syntax, the abstract syntax being defined by an industry standard and the diagram interchange syntax being defined by industry standard;

a declarative description generator providing a declarative description of the graphical concrete syntax of a diagram of the model; and a mapping engine modeling a structured mapping between (i) the graphical concrete syntax of the diagram and (ii) the abstract syntax and the corresponding diagram interchange syntax of the model, wherein the provided declarative description and modeling specifies the graphical concrete syntax of the graphical modeling language in a formal manner that enables unambiguous and complete specification of the graphical modeling language.

11. A computer system as claimed in claim 10 wherein the declarative description generator further models graphical building blocks that form the graphical concrete syntax.

12. A computer system as claimed in claim 11 wherein the structured mapping is between (i) the graphical building blocks and (ii) the abstract syntax and the corresponding diagram interchange syntax of the model.

13. A computer system as claimed in claim 10 wherein the mapping engine employs a declarative description of the structured mapping.

14. A computer system as claimed in claim 13 wherein the declarative descriptions employ a diagram graphics language having a figure type.

15. A computer system as claimed in claim 14 wherein the diagram graphics language further includes:
    a layout type enabling representation of layout algorithms; and
    a layout data type enabling representation of attributes.

16. A computer system as claimed in claim 15 wherein values of the attributes may be set by default.

17. A computer system as claimed in claim 14 wherein figures of the figure type may be nested.

18. A computer system as claimed in 13 wherein the declarative descriptions effectively define structure of the graphical concrete syntax rather a rendering logic of the graphical concrete syntax.

19. A computer program product for specifying graphical concrete syntax in a modeling language, the computer program product comprising:
    a computer readable storage medium having computer readable program code embodied therewith;
    the computer readable program code comprising computer readable program code configured to:
    provide a model using a graphical modeling language having (i) an abstract syntax defined by an industry standard, (ii) a graphical concrete syntax and (iii) an industry standard diagram interchange syntax, the graphical concrete syntax being graph elements that constitute surface notation and that map to abstract syntax and diagram interchange syntax counterparts;
    generate a declarative description of the graphical concrete syntax of a diagram of the model, and
    map between (i) the graphical concrete syntax of the diagram and (ii) the abstract syntax and the diagram interchange syntax of the model,
    wherein the declarative description and the map specifies the graphical concrete syntax of the graphical modeling language in a formal manner that enables unambiguous and complete specification of the modeling language.

20. A computer program product as claimed in claim 19 wherein;
    the map is represented by a respective declarative description; and
    the declarative descriptions effectively define structure of the graphical concrete syntax rather than rendering logic of the graphical concrete syntax.

* * * * *